US008736127B2

(12) United States Patent
Schlote

(10) Patent No.: US 8,736,127 B2
(45) Date of Patent: May 27, 2014

(54) DYNAMOELECTRIC DEVICE AND METHOD OF FORMING THE SAME

(75) Inventor: Andrew Schlote, Fenton, MO (US)

(73) Assignee: InnerPoint Energy Corporation, Kirkwood, MO (US)

( * ) Notice: Subject to any disclaimer, the term of this patent is extended or adjusted under 35 U.S.C. 154(b) by 585 days.

(21) Appl. No.: 13/029,922

(22) Filed: Feb. 17, 2011

(65) Prior Publication Data

US 2012/0212088 A1 Aug. 23, 2012

(51) Int. Cl.
*H02K 3/12* (2006.01)

(52) U.S. Cl.
USPC .............. 310/184; 310/198; 310/208; 29/596

(58) Field of Classification Search
USPC .................................................. 310/201, 208
See application file for complete search history.

(56) References Cited

U.S. PATENT DOCUMENTS

| 268,205 | A | * | 11/1882 | Edison | 310/195 |
|---|---|---|---|---|---|
| 3,090,878 | A | * | 5/1963 | Karlby et al. | 310/166 |
| 3,176,176 | A | * | 3/1965 | Willyoung | 310/208 |
| 4,115,915 | A | * | 9/1978 | Godfrey | 29/596 |
| 4,321,497 | A | | 3/1982 | Long | |
| 4,437,230 | A | | 3/1984 | Greutmann | |
| 5,422,526 | A | * | 6/1995 | Kawabata et al. | 310/201 |
| 5,623,178 | A | * | 4/1997 | Kawabata et al. | 310/260 |
| 5,773,905 | A | * | 6/1998 | Hill | 310/201 |
| 6,252,327 | B1 | * | 6/2001 | Matsuzaki | 310/201 |
| 6,538,356 | B1 | * | 3/2003 | Jones | 310/216.001 |
| 6,566,778 | B1 | | 5/2003 | Hasegawa et al. | |
| 6,958,561 | B2 | * | 10/2005 | Liao | 310/179 |
| 7,582,999 | B2 | * | 9/2009 | Atkinson | 310/179 |
| 7,723,879 | B2 | * | 5/2010 | Fujii et al. | 310/71 |
| 8,072,114 | B2 | * | 12/2011 | Ciampolini et al. | 310/201 |
| 2009/0230808 | A1 | * | 9/2009 | Tatebe | 310/201 |
| 2010/0194231 | A1 | | 8/2010 | Rippel et al. | |
| 2010/0207482 | A1 | | 8/2010 | Kim et al. | |

FOREIGN PATENT DOCUMENTS

| DE | 101 43 217 | * | 2/2003 | H02K 3/12 |
|---|---|---|---|---|
| DE | 10 2006 038 582 | * | 2/2008 | H02K 3/04 |
| DE | 10 2007 021 737 | * | 11/2013 | H02K 3/12 |

* cited by examiner

*Primary Examiner* — Burton Mullins
(74) *Attorney, Agent, or Firm* — Thompson Coburn LLP

(57) ABSTRACT

A dynamoelectric device comprises a plurality of armatures arranged circumferentially about an axis, sets of electrically conductive winding members that extend axially through the stack of laminates and are positioned circumferentially between each adjacent pair of the armatures, and first and second layers of end-turn members. Each of the end-turn members of the first axial layer is connected to one of the winding members. Each of the end-turn members of the first axial layer extends clockwise circumferentially from its respective one of the winding members. Each of the end-turn members of the second axial layer is connected to one of the winding members and to each of the end-turn members of the first axial layer of end-turn members. Each of the end-turn members of the second axial layer extends counter-clockwise circumferentially from its respective one of the winding members. The winding members are each formed of Litz wire.

16 Claims, 5 Drawing Sheets

DYNAMOELECTRIC DEVICE AND METHOD OF FORMING THE SAME

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention pertains to dynamoelectric devices. More particularly, the present invention pertains to a unique configuration and method of forming the end-turns and windings of the coils of a dynamoelectric device.

2. General Background

Dynamoelectric electric devices, such as generators, alternators, and motors, typically comprise coils (also frequently called windings) that conduct electricity between adjacent armatures of either the stator or rotor. The electrical current conducted through the coils is typically looped back between another adjacent pair of armatures via what are commonly referred to as end-turns. While the current running through the end-turns can have positive contributions to the magnetic flux fields of a dynamoelectric device, such contributions are typically less than the negative contributions caused by current running through the end-turns. Thus, it is desirable to minimize the net magnetic flux field generated by the end-turns. It is also generally desirable for the end-turns to be as compact as possible.

Dynamoelectric devices also typically use solid-core wire to form each winding of a coil. However, solid-core wire is inefficient at carrying high frequency alternating current due to skin effects and proximity effects. As a result the resistance of such windings increases as the rotational velocity of the dynamoelectric devices increase. Thus, solid core wire windings in some cases can be inefficient.

SUMMARY OF THE INVENTION

The present invention provides for a very compact and efficient end-turn configuration. In one aspect of the invention, a dynamoelectric device comprises a stack of laminates that form a plurality of armatures arranged circumferentially about an axis. The axis defines axial, radial, and circumferential directions for reference purposes. A first set of electrically conductive winding members extends axially through the stack of laminates and is positioned circumferentially between an adjacent pair of the armatures. A second set of electrically conductive winding members extends axially through the stack of laminates and is positioned circumferentially between another adjacent pair of the armatures. The device also comprises first and second sets of end-turn members. The end-turn members of the first set of end-turn members are connected to the winding members of the first set of winding members in a one-to-one manner. Each of the end-turn members of the first set of end-turn members is disposed within a unique axial volume of space. These axial volumes of space constitute a first set of axial volumes of space and are axially spaced from each other in a manner defining a second set of axial volumes of space interleaved with the first set of axial volumes of space. The end-turn members of the second set of end-turn members are connected to the winding members of the second set of winding members in a one-to-one manner and to each of the end-turn members of the first set of end-turn members in a one-to-one manner. Each of the end-turn members of the second set of end-turn members is disposed within a unique one of the axial volumes of space of the second set of axial volumes of space.

In another aspect of the invention, a dynamoelectric device comprises a stack of laminates that form a plurality of armatures arranged circumferentially about an axis. The axis defines axial, radial, and circumferential directions for reference purposes. The device also comprises sets of electrically conductive winding members that extend axially through the stack of laminates and are positioned circumferentially between each adjacent pair of the armatures in a one set-to-one pair of armatures manner. The device also comprises first and second layers of end-turn members. Each of the end-turn members of the first axial layer is connected to one of the winding members of one of the sets of winding members in a one end-turn member-to-one set of winding members manner. Each of the end-turn members of the first axial layer extends clockwise circumferentially from its respective one of the winding members and extends radially outward as it does so. Each of the end-turn members of the second axial layer is connected to one of the winding members of one of the sets of winding members in a one end-turn member-to-one set of winding members manner and to each of the end-turn members of the first axial layer of end-turn members in a one-to-one manner. Each of the end-turn members of the second axial layer extends counter-clockwise circumferentially from its respective one of the winding members and extends radially outward as it does so.

Yet another aspect of the invention pertains to a method of forming a dynamoelectric device. The dynamoelectric device comprises a stack of laminates that form a plurality of armatures arranged circumferentially about an axis. The axis defines axial, radial, and circumferential directions for reference purposes. The method comprises extending a first set of electrically conductive winding members axially through the stack of laminates and circumferentially between an adjacent pair of the armatures. The method also comprises extending a second set of electrically conductive winding members axially through the stack of laminates and circumferentially between another adjacent pair of the armatures. Furthermore, the method comprises bonding a first set of end-turn members to the winding members of the first set of electrically conductive winding members in a one-to-one manner using a soldering, brazing, or welding technique. Still further, the method comprises bonding a second set of end-turn members to the winding members of the second set of electrically conductive winding members in a one-to-one manner and to each of the end-turn members of the first set of end-turn members in a one-to-one manner using a soldering, brazing, or welding technique.

Still further, in another aspect of the invention, a dynamoelectric device comprises a stack of laminates that form a plurality of armatures arranged circumferentially about an axis. The axis defines axial, radial, and circumferential directions. The dynamoelectric device further comprises a first set of electrically conductive winding members that extend axially through the stack of laminates and that are positioned circumferentially between an adjacent pair of the armatures. Each of the winding members is a woven band of Litz wire.

By forming winding members out of Litz wire (as opposed to out of solid-core wire), the resistance within the windings remains low even when they carry high frequency current.

Further features and advantages of the present invention, as well as the operation of various embodiments of the present invention, are described in detail below with reference to the accompanying drawings.

Figure 1:
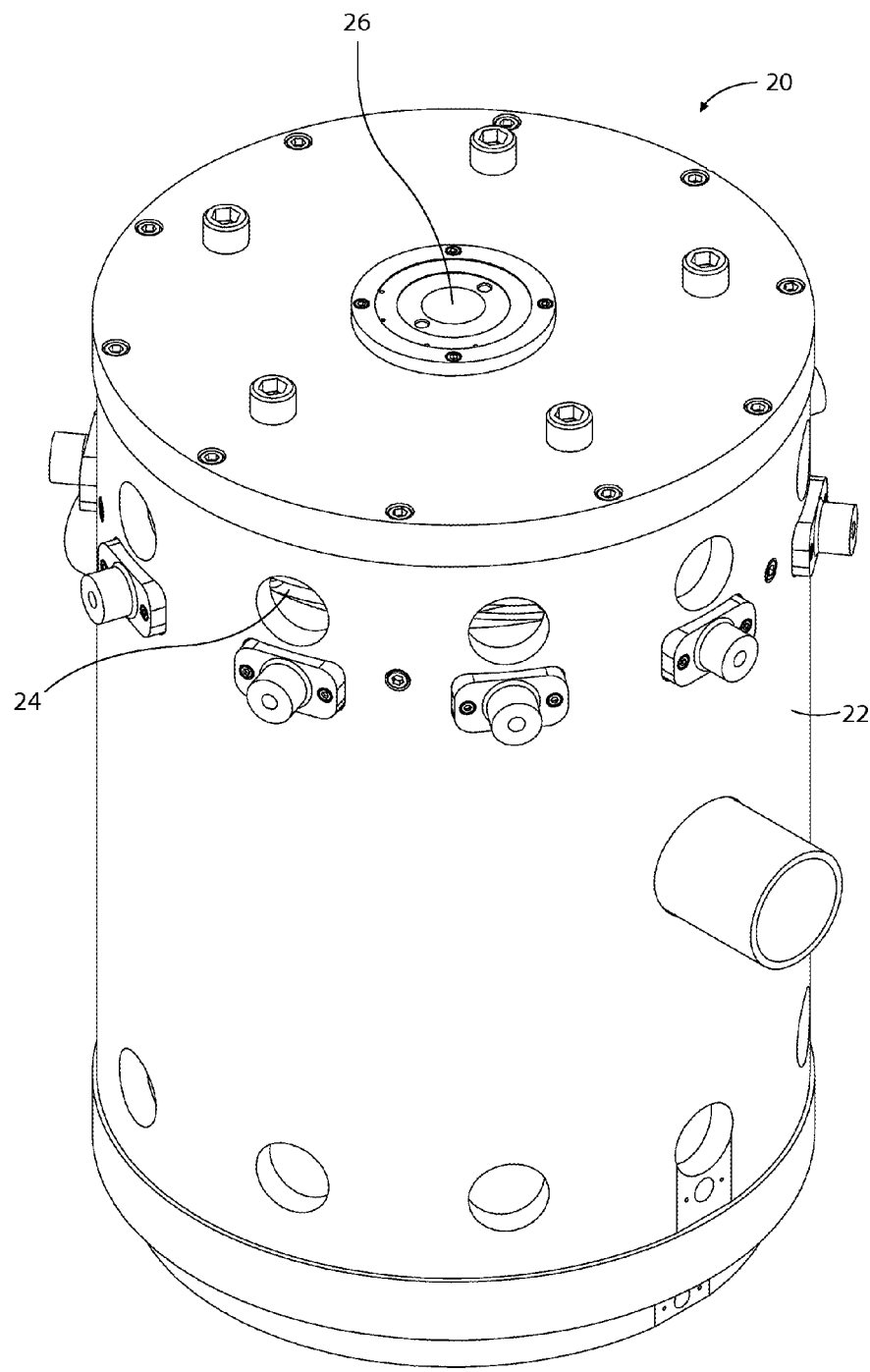
FIG. 1 is a perspective view of a dynamoelectric device in accordance with the invention.
Figure 2:
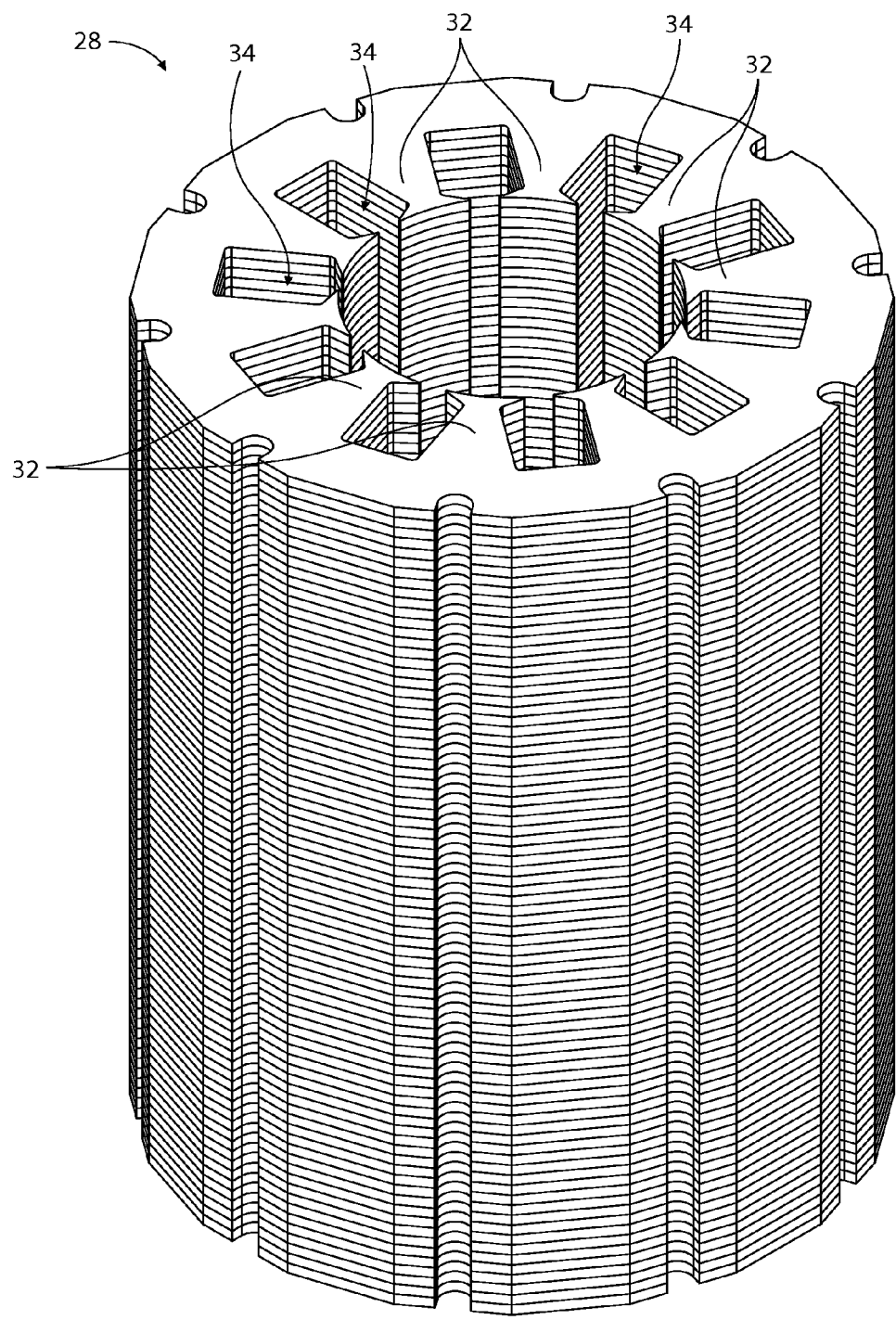
FIG. 2 is a perspective view of a stack of laminates that form the main body of the stator of the dynamoelectric device shown in FIG. 1.

Reference numerals in the written specification and in the drawing figures indicate corresponding items.

DETAILED DESCRIPTION OF THE PREFERRED EMBODIMENTS

A dynamoelectric device in accordance with the invention is shown in FIG. 1. This particular dynamoelectric device 20 is configured to function as a generator. The dynamoelectric device 20 comprises a housing 22 that surrounds the stator 24 and the rotor 26. The rotor 26 is preferably a cylindrical body having magnetic poles formed by permanent magnets. The magnets are preferably formed of a rare-earth metal.

The stator 24 of the dynamoelectric device 20 comprises a stack of laminates 28 and a plurality of coils 30. The laminates are configured in a manner that forms a plurality of armatures 32 that are circumferentially spaced about an axis and that protrude radially inward toward the axis. As such, a slot 34 is formed between each adjacent pair of the armatures 32. The coils 30 extend axially through these slots 34. Preferably there are ten armatures 32 and five seperate coils 30.

The five coils 30 are preferably generally identical to each other. One of the coils 30 is shown by itself in FIGS. 4-6. Unlike more traditional coils, which are typically formed by wrapping wire around one or more armatures, each of the coils 30 of the preferred embodiment of the invention comprises separate winding members 36 and end-turn members 38 that are assembled to each other in a manner creating the coil. Each of the winding members 36 is preferably a band of electrically conductive Litz wire. The winding members 36 of the coil 30 are stacked against each other in a manner forming two sets of winding members that are each comprised of ten of the winding members. Each winding member 36 of each set is preferably separated from each adjacent winding member by a thin sheet of electrical insulation (which is omitted in the figures for clarity). One of the winding members 36 in the middle of each set has a free end. These two free ends serve as the terminal ends 40 of the coil 30. The end-turn members 38 are preferably formed out of copper plate or sheet. Each end-turn member 38 comprises a rectangular slot 42 for receiving an end of one of the winding members 36. The end-turn members 38 are each operatively connected to its respective winding member 36, preferably via solder or solid-state welding. As is most clearly shown in FIG. 5, the end-turn members 38 are curved in a manner such that they extend circumferentially slightly more than ninety degrees. The end-turn members 38 are also configured such that each end-turn member extends radially outward from the axis as the end-turn member extends circumferentially away from its respective winding member 36. Approximately half of the end-turn members 38 at both ends of each set of the winding members 36 extend clockwise from such end while the remainder extend counter-clockwise therefrom. The end-turn members 38 are axially spaced from each other as they extend circumferentially about the axis. However, the tips 44 of the end-turn members 38 overlap and intermesh with each other. Where the tips 44 of the end-turn members 38 overlap, the end-turn members are operatively connected to each other in pairs (preferably using solder or solid state welding).

In view of the foregoing, it should be appreciated that each coil 30 is configured such that the electrical path of the coil loops ten times down one of the sets of winding members 36 and ten times up the other set of the winding members, and such that approximately half of the current passes circumferentially in the end-turns 38 to one side of the axis from one of the sets of winding members to the other while the remainder of the current passes in the end-turns generally symmetrically on the opposite side of the axis. By passing the current from one of the sets of winding members 36 to the other symmetrically (or nearly symmetrically) and in planes perpendicular to the axis, the magnetic fields created by the current passing through the end-turns generally cancel out (at least within the core of the stator). Thus, the configuration of the end-turns minimizes the negative impact that the end-turns have on the magnetic flux fields within the dynamoelectric device, thereby improving the efficiency of the dynamoelectric device. Moreover, this configuration minimizes the length of the end-turns, which minimizes winding losses. It should also be appreciated that forming the winding members 36 out of Litz wire minimizes the proximity effect within each winding member and thereby greatly decreases the resistance of said winding member. This can be highly advantageous in itself in situations where the current in the windings is high frequency alternating current. For example, this keeps the dynamoelectric device described herein highly efficient, even when the device is operating at tens of thousands of revolutions per minute (which it is intended to do).

Figure 3:
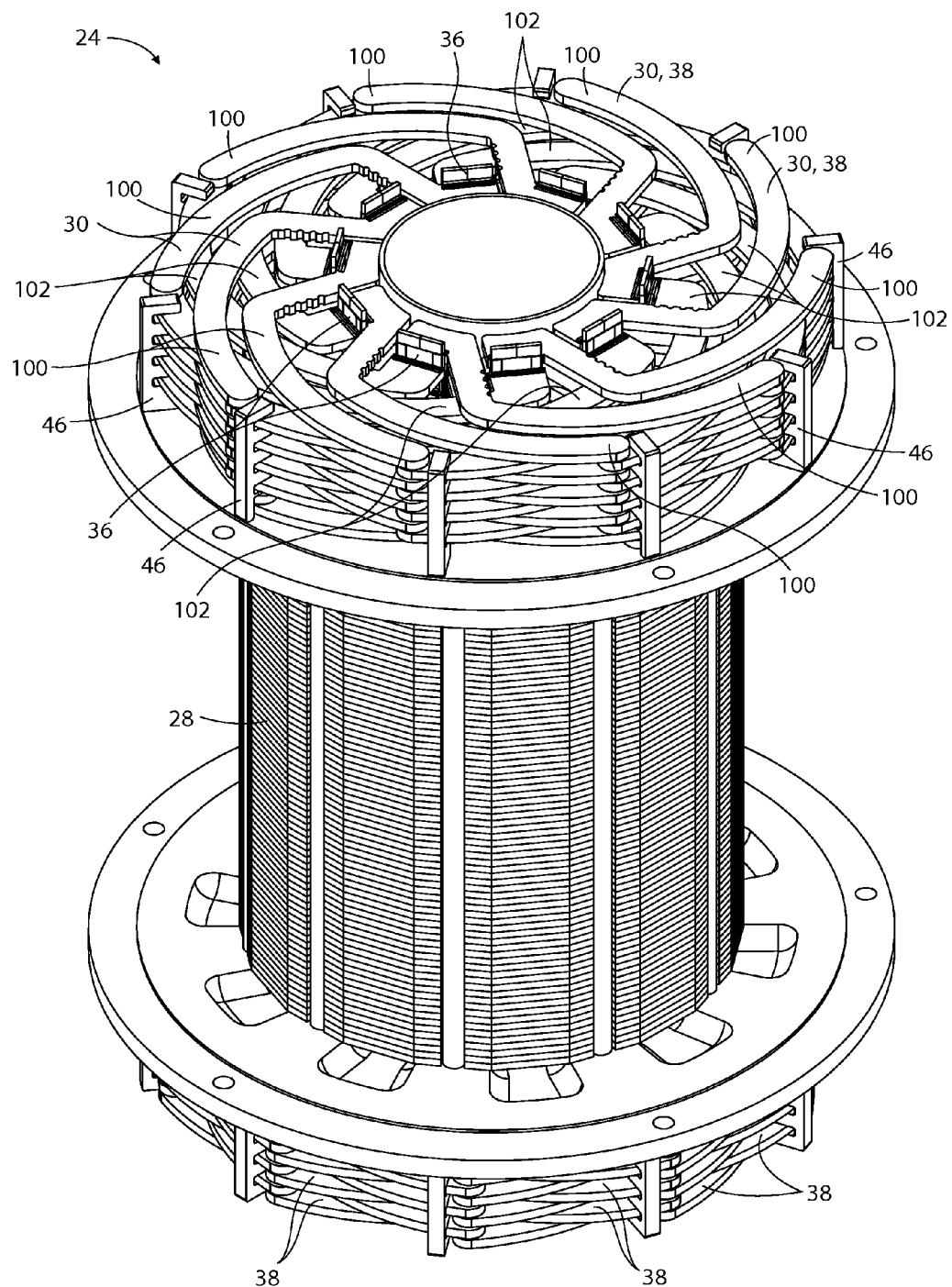
FIG. 3 is a perspective view showing the coils attached to the stator of the dynamoelectric device shown in FIG. 1.
Figure 4:
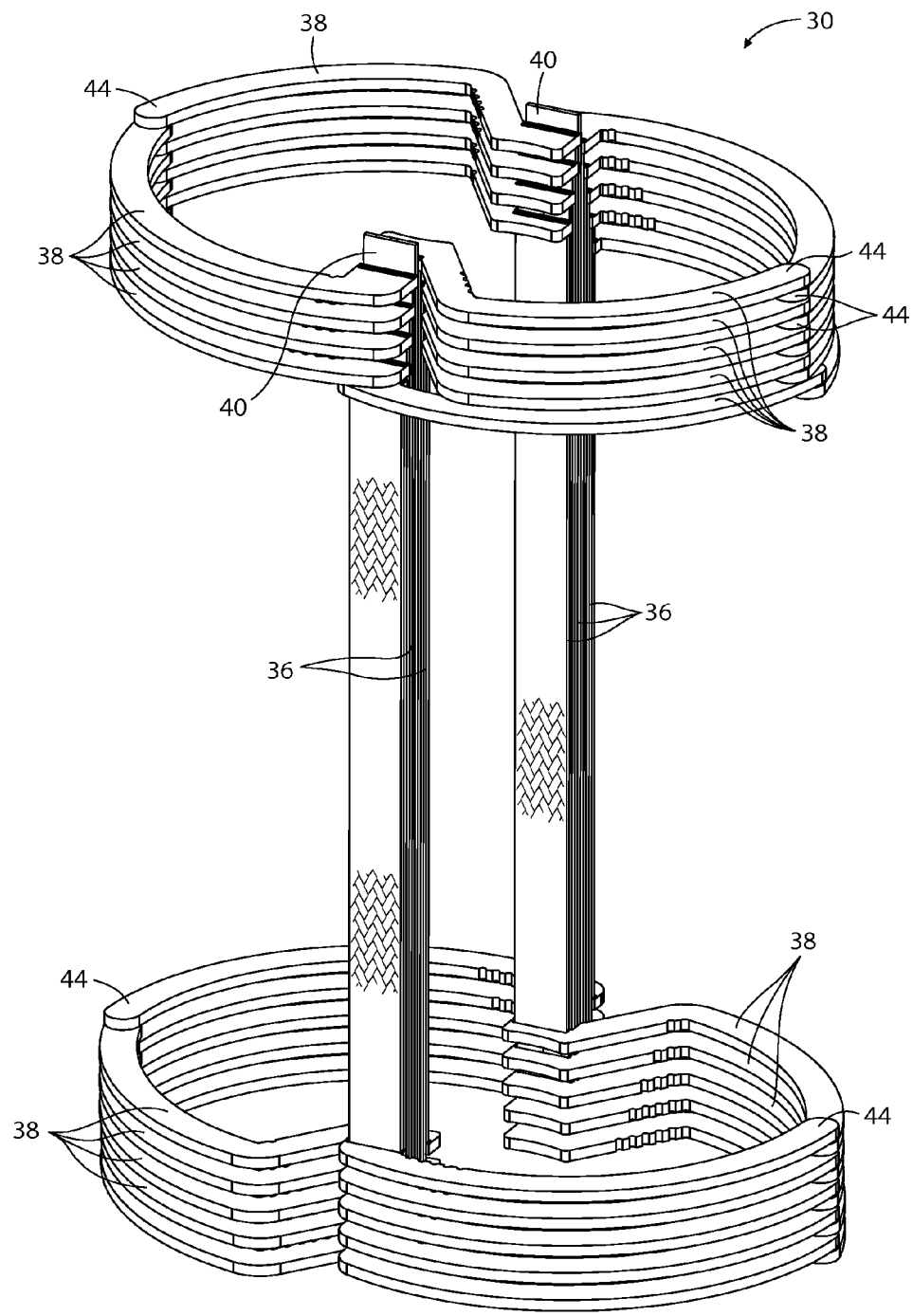
FIG. 4 is a perspective view of one of the coils of the stator of the dynamoelectric device shown in FIG. 1.
Figure 5:
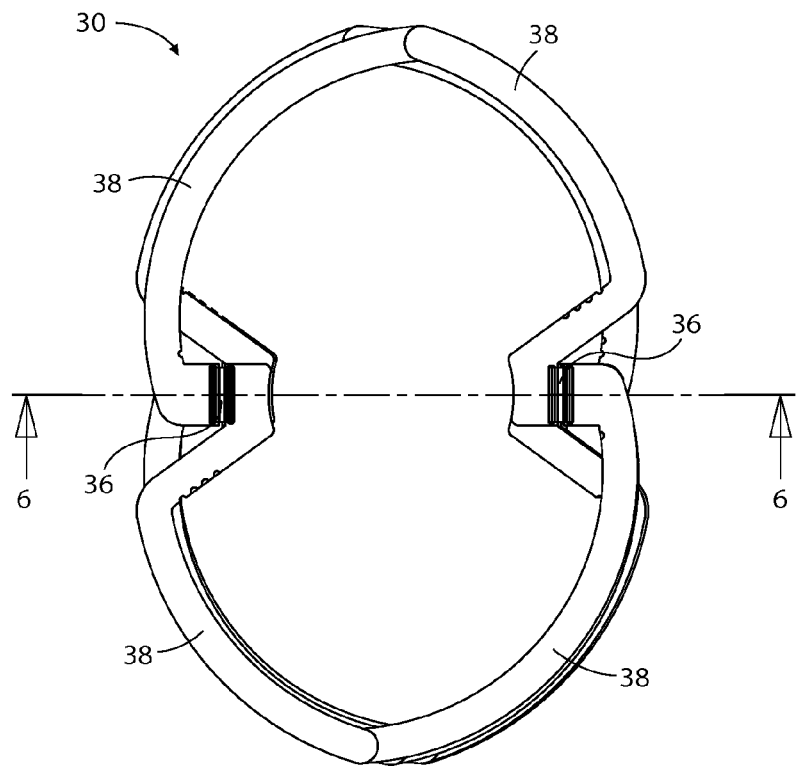
FIG. 5 is a top view of the coil shown in FIG. 4.
Figure 6:
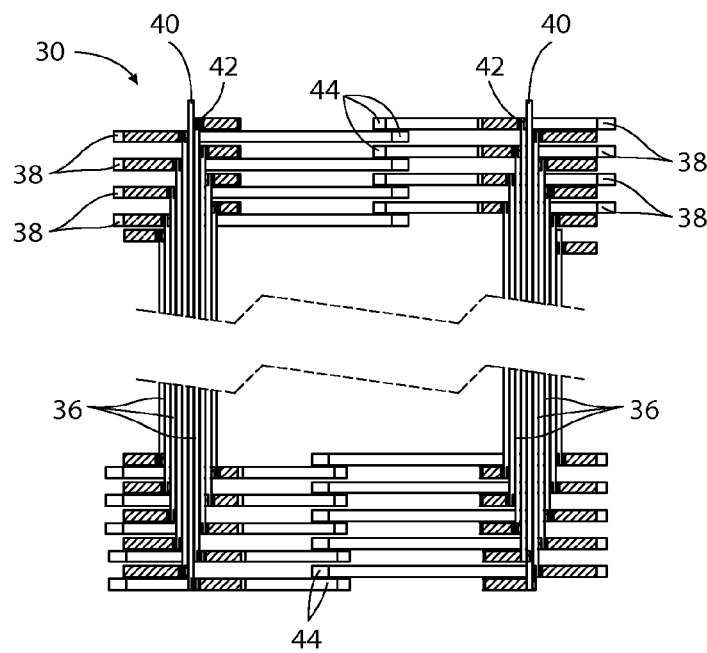
FIG. 6 is a broken cross-sectional view of the coil shown in FIGS. 4 and 5, as taken about the line 6-6 shown in FIG. 5.

Although a single coil 30 is shown by itself in FIGS. 4-6, the plurality of coils in the dynamoelectric device 20 are assembled in a manner such that they become interlocked and intermeshed with each other. Preferably, the end-turn members 38 of each coil 30 are assembled to the device one axial layer at a time. For example the end-turn members indicated by the numeral 100 in FIG. 4 constitute one axial layer of end-turn members and those indicated by the numeral 102 constitute another axial layer. In this manner, the coils 30 become intermeshed and interlocked. A sheet of electrical insulation is preferably placed between each axial layer of the end-turns 30, leaving openings therethrough to allow for the appropriate operative connections between the tips 44 of the end-turns to be made. Slotted spacer members 46 are preferably utilized to support the end-turn members 38 in their proper orientation relative to each other, both during and after assembly. As can be seen in FIG. 3, even though the end-turns 30 are compactly intermeshed with each other, there are voids between the elements that form the end-turns. These voids allow cooling air or another type of cooling fluid to be circulated around each of the end-turn members, which facilitates the dissipation of heat from the end-turns.

The dynamoelectric device 20 of the preferred embodiment of the invention is particularly configured to be attached to a high speed rotary heat engine that drives the rotor 26 at tens of thousands of revolutions per minute relative to the stator 24. As the rotor 26 spins within the stator 24 the magnetic field of the rotor's magnets (which rotates with the rotor), induces electricity in each of the coils 30 of the dynamoelectric device 20. The five coils 30 thereby collectively produce five-phase electricity which can be converted to whatever type of electrical current is desired using any technique known in the art.

It should be appreciated that the invention provides for compact and highly efficient end-turn configuration for dynamoelectric devices. It should also be appreciated that the invention could be utilized on a rotor of the type having electro-magnets and that it could be utilized in connection with all types of dynamoelectric devices, such as electric motors. It should further be appreciate that the invention is not limited to two-pole winding configurations and could be utilized in connection with other devices having four-pole, twelve-pole, or distributed wire pattern configurations.

It should also be appreciated that, as used in the claims, the phrase "axial volume of space" means a volume of space extending between two planes that are perpendicular/normal to the rotor axis of the dynamoelectric device.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of the preferred embodiment of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A dynamoelectric device comprising:
   a stack of laminates that form a plurality of armatures arranged circumferentially about an axis, the axis defining axial, radial, and circumferential directions;
   a first set of electrically conductive winding members extending axially through the stack of laminates and being positioned circumferentially between an adjacent pair of the armatures;
   a second set of electrically conductive winding members extending axially through the stack of laminates and being positioned circumferentially between another adjacent pair of the armatures;
   a first set of end-turn members, the end-turn members of the first set of end-turn members being connected to the winding members of the first set of electrically conductive winding members in a one-to-one manner, each of the end-turn members of the first set of end-turn members being disposed within a unique axial volume of space, the axial volumes of space constituting a first set of axial volumes of space and being axially spaced from each other in a manner defining a second set of axial volumes of space interleaved with the first set of axial volumes of space;
   a second set of end-turn members, the end-turn members of the second set of end-turn members being connected to the winding members of the second set of electrically conductive winding members in a one-to-one manner and to each of the end-turn members of the first set of end-turn members in a one-to-one manner, each of the end-turn members of the second set of end-turn members being disposed within a unique one of the axial volumes of space of the second set of axial volumes of space.

2. A dynamoelectric device in accordance with claim 1 wherein each of the end-turn members has a polygonal cross-section.

3. A dynamoelectric device in accordance with claim 2 wherein each of the end-turn members has a rectangular cross-section having opposite sides that are parallel to the axis and each of the winding members is a woven band of electrically conductive Litz wire.

4. A dynamoelectric device in accordance with claim 1 wherein each of the end-turn members extends circumferentially from its respective one of the winding members and extends radially outward as it does so.

5. A dynamoelectric device in accordance with claim 1 wherein each of the end-turn members of the first and second sets of end-turn members is connected to its respective one of the winding members by a filler metal that this melt-bonded thereto.

6. A dynamoelectric device in accordance with claim 1 wherein each of the end-turn members is welded to its respective one of the winding members.

7. A dynamoelectric device in accordance with claim 1 wherein each of the winding members is radially separated from an adjacent one of the winding members by a sheet of insulating material.

8. A dynamoelectric device in accordance with claim 1 wherein each of the end-turn members connects to its respective one of the winding members at an intersection that forms approximately a right angle.

9. A dynamoelectric device in accordance with claim 1 wherein the first and second sets of windings are circumferentially spaced directly opposite from each other about the axis.

10. A dynamoelectric device in accordance with claim 1 wherein each of the end-turn members comprises a planar surface that lies in a plane that is oriented normal to the axis.

11. A dynamoelectric device in accordance with claim 1 wherein the end-turn members of the first and second set of end-turn members are oriented relative to each other in a manner such that cooling fluid can be passed between the end-turn members.

12. A dynamoelectric device comprising:
    a stack of laminates that form a plurality of armatures arranged circumferentially about an axis, the axis defining axial, radial, and circumferential directions;
    sets of electrically conductive winding members extending axially through the stack of laminates and being positioned circumferentially between each adjacent pair of the armatures in a one set-to-one pair of armatures manner;
    a first axial layer of end-turn members, each of the end-turn members of the first axial layer being connected to one of the winding members of one of the sets of winding members in a one end-turn member-to-one set of winding members manner, each of the end-turn members of the first axial layer extends clockwise circumferentially from its respective one of the winding members and extends radially outward as it does so; and a second axial layer of end-turn members, each of the end-turn members of the second axial layer being connected to one of the winding members of one of the sets of winding members in a one end-turn member-to-one set of winding members manner and to each of the end-turn members of the first axial layer of end-turn members in a one-to-one manner, each of the end-turn members of the second axial layer extends counter-clockwise circumferentially from its respective one of the winding members and extends radially outward as it does so.

13. A dynamoelectric device in accordance with claim 12 wherein two of the sets of winding members are circumferentially spaced directly opposite from each other about the axis.

14. A dynamoelectric device in accordance with claim 12 wherein the dynamoelectric device comprises a stator and the stack of laminates forms a portion of the stator.

15. A method of forming a dynamoelectric device, the dynamoelectric device comprising a stack of laminates that form a plurality of armatures arranged circumferentially about an axis, the axis defining axial, radial, and circumferential directions, the method comprising:

extending a first set of electrically conductive winding members axially through the stack of laminates and circumferentially between an adjacent pair of the armatures;

extending a second set of electrically conductive winding members axially through the stack of laminates and circumferentially between another adjacent pair of the armatures;

bonding a first set of end-turn members to the winding members of the first set of electrically conductive winding members in a one-to-one manner using one of a soldering, brazing, and welding technique; and bonding a second set of end-turn members to the winding members of the second set of electrically conductive winding members in a one-to-one manner and to each of the end-turn members of the first set of end-turn members in a one-to-one manner using one of a soldering, brazing, and welding technique.

16. A method in accordance with claim 15 further comprising:

extending a third set of electrically conductive winding members axially through the stack of laminates and circumferentially between a third adjacent pair of the armatures;

extending a fourth set of electrically conductive winding members axially through the stack of laminates and circumferentially between a fourth adjacent pair of the armatures;

bonding a third set of end-turn members to the winding members of the third set of electrically conductive winding members in a one-to-one manner using one of a soldering, brazing, and welding technique;

bonding a fourth set of end-turn members to the winding members of the fourth set of electrically conductive winding members in a one-to-one manner and to each of the end-turn members of the third set of end-turn members in a one-to-one manner using one of one of a soldering, brazing, and welding technique.

* * * * *